United States Patent [19]

Yasuda et al.

[11] Patent Number: 5,142,001
[45] Date of Patent: Aug. 25, 1992

[54] POLYURETHANE COMPOSITION

[75] Inventors: Masahiko Yasuda; Shigeo Hosokawa; Yorozu Yokomori; Yukiyoshi Ito; Koji Hisamura, all of Mie, Japan

[73] Assignees: Kyowa Hakko Kogyo Co., Ltd., Tokyo, Japan; The B. F. Goodrich Company, Akron, Ohio

[21] Appl. No.: 740,258

[22] Filed: Aug. 5, 1991

[30] Foreign Application Priority Data

Jul. 17, 1991 [JP] Japan .................................. 3-268093

[51] Int. Cl.⁵ ............................................. C08L 75/04
[52] U.S. Cl. ...................................... 525/453; 524/86; 525/460; 528/73
[58] Field of Search ................... 525/453, 460; 524/86; 528/73

[56] References Cited

U.S. PATENT DOCUMENTS 4,351,915 9/1982 Kubota et al. ........................ 528/73

Primary Examiner—Maurice J. Welsh
Attorney, Agent, or Firm—Debra L. Pawl; Daniel J. Hudak

[57] ABSTRACT

This invention pertains to the polyurethane composition with hydrophilicity and hydrolysis resistance. The purpose of this invention is achieved by:

1) A polyurethane molecule containing at least one acidic hydrophilic group in the molecule which is neutralized with piperidine derivatives and piperazinone derivatives, or 2) A mixture containing polyurethane and compounds(s) having at least one acidic hydrophilic group which is neutralized with piperidine derivatives and piperazinone derivatives.

The invention polyurethane compositions which have excellent hydrolysis resistance and rupture strength are useful for adhesives, paints, and bonding agents for magnetic recording media.

20 Claims, No Drawings

POLYURETHANE COMPOSITION

FIELD OF THE INVENTION

This invention pertains to polyurethane compositions. The polyurethane compositions are used for adhesives, paint, and magnetic recording media bonding agents.

BACKGROUND OF THE INVENTION

It is well established that, in order to increase the hydrophilicity of polyurethane which is derived from polyester based polyols, carboxylic group(s), sulfonate groups(s), phosphate groups(s), or their alkali metal salt(s) are added to the polyurethane molecule (i.e., Kokai Sho 54-157603, Kokai sho 57-92422, kokai Sho 60-15473, EP-A-367667). However, when an acid group was added to the skeleton of polyurethane or an additive containing acid group(s) was mixed with polyurethane, then the hydrolysis of polyester polyol was accelerated in the presence of moisture in the air or in water, and this brought about the deterioration of the properties of polyurethane. As the neutralizing agent of the acid group, an alkali metal salt was used but the salt was not sufficient to prevent the deterioration of the polyurethane properties. Thus, a polyurethane with high hydrophilicity and good properties is needed.

SUMMARY OF THE INVENTION

This invention pertains to;
a polyurethane containing acidic hydrophilic group(s) in the polyurethane molecule (acidic hydrophilic group containing polyurethane hereafter), or
a mixture containing polyurethane and compound(s) containing acidic hydrophilic group(s) (acidic hydrophilic group containing compound hereafter),
which are neutralized with piperidine derivative(s) or piperazinone derivative(s) to prepare polyurethane compositions.

DETAILED DESCRIPTION

Acidic hydrophilic groups include compounds which contain at least one carboxylic group, sulfonate group, phosphate group, carboxyl group and a hydroxy group, sulfonate group and a hydroxy group, or a phosphate group and a hydroxy group, and combinations thereof. Such groups, as noted above, can either exist as a mixture with a polyurethane or as part of the polyurethane molecule. When incorporated within the urethane molecule, such polyurethanes are known (i.e., Kokai Sho 54-157603, Kokai Sho 57-92422, Kokai Sho 60-15473, EP-A-367667) and are prepared in the following way.

These polyurethanes, which are well known to the art and to the literature, are obtained by the reaction of 1) a diisocyanates, 2) a polyfunctional hydroxy compounds, 3) a compound containing a carboxylic group, a sulfonate group, or a phosphate group, either alone or in combination with a hydroxy group, and 4) a chain lengthening reagent. In this reaction, a catalyst was used if needed. Generally, the type of polyurethane which can be utilized is not limited and, thus, typically any type of isocyanate, polyfunctional hydroxy compound, chain extender, and the like, can be utilized including commercially available polyurethanes.

Examples of diisocyanates which can be used in the preparation of the polyurethane include 2,4-tolylenediisocyanate, 2,6-tolylenediisocyanate, p-phenylenediisocyanate, diphenylmethanediisocyanate, m-phenylenediisocyanate, hexamethylenediisocyanate, tetramethylenediisocyanate, 3,3-dimethoxy-4,4-biphenylenediisocyanate, 2,4-naphthalenediisocyanate, 3,3-dimethyl-4,4-biphenylenediisocyanate, 4,4-diphenylenediisocyanate, 4,4-diisocyanate-diphenyl ether, 1,5-naphthalenediisocyanate, p-xylenediisocyanate, m-xylenediisocyanate, 1,3-diisocyanatemethylcyclohexane, 1,4-diisocyanatemethylcyclohexane, 4,4-diisocyanatedicyclohexane, 4,4-diisocyanatedicyclohexylmethane, and isophoronediisocyanate, and the like.

Examples of polyfunctional hydroxy compounds include polyethylene adipate, polybutylene adipate (i.e., poly(1,4-butylene adipate), polyhexylene adipate, polyneoprenepentyl glycol adipate, polyethylene propylene adipate, cyclohexanedimethanol adipate, terephthalate base polyols, polycaprolactone polyol (i.e., Placcel 210: Daicel Kagaku Kogyo Kabushiki Kaisha), polyoxyethylene glycol, polyoxypropylene glycol, polyoxyethylene polyoxypropylene polyol, polyoxytetramethylene polyol, polycarbonate polyol, 3-methyl-1,5-pentane adipate, polypentadiene polyol, castor oil polyol, or $\beta$-methyl-$\delta$-valerolactone polyol, and the like.

Examples of chain lengthening agents include polyols having molecular weights of less than 500 (i.e., ethylene glycol, diethylene glycol, propylene glycol, dipropylene glycol, 1,4-butylene glycol, 1,3-butanediol, 1,6-hexylene glycol, glycerin, trimethylolpropane, 3-methyl-3-hydroxy-1,5-pentanediol, pentaerythritol, sorbitol, 1,4-cyclohexanediol, 1,4-cyclohexanedimethanol, xylene glycol, neopentyl glycol, 3-methyl-1,3-butanediol, etc.), the diamines having molecular weights of less than 500 (i.e., ethylenediamine, tetramethylenediamine, hydrazine, hexamethylenediamine, 1,4-cyclohexanediamine, etc.), alkanolamines (i.e., ethanolamine, diethanolamine, triethanolamine, etc.), hydroquinone, pyrogallol, 4,4-isopropylidenediphenol, aniline, bisphenol A, etc, and the like.

Inasmuch as generally any type of polyurethane can be utilized including those known to the art and to the literature, the ratios of the urethane forming components can also be those generally known to the art and to the literature and include, as for example, an equivalent ratio of the total amount of ioscyanate groups to the total amount of the hydroxyl groups of the urethane forming components of from about 0.8 to about 1.2.

The amount of the one or more hydrophilic acid containing compounds is a sufficient or an effective amount to generally impart improved properties to the various polyurethanes, such as imparting improved pigment dispersion to magnetic pigments. Hence, the amount will vary with respect to the particular urethane, the particular hydrophilic acid containing compound, the type of particle dispersed, and the like.

Examples of carboxyl group containing compounds include acetic acid, propionic acid, butyric acid, palmitic acid, stearic acid, myristic acid, oleic acid, caprylic acid, lauric acid, coconut acid, caproic acid, linoleic acid, beef tallow acid, adipic acid, maleic acid, benzoic acid, phthalic acid, terephthalic acid, and isophthalic acid, etc.

Examples of sulfonate group containing compounds include sulfuric acid, paratoluenesulfonic acid, naphthalenesulfonic acid, benzenesulfonic acid, 5-sulfoisophthalic acid, 2-sulfophthalic acid, 5-sulfobenzoic acid, N,N-bis(2-hydroxyethyl)-2-aminoethanesulfonic acid, sulfophthalic acid, dodecylbenzenesulfonic acid, oleyl methyl tauric acid, lauryl methyl tauric acid, sulfosuccinate, etc.

Examples of phosphate group containing compounds include phosphoric acid, phosphorous acid, butyl acid phosphate, butoxyethyl acid phosphate, 2-ethylhexyl acid phosphate, di(2-ethylhexyl phosphate, isodecyl acid phosphate, monoisodecyl phosphate, Gafac RE 410 (Tobo Kagaku Kabushiki Kaisha, trade name), and lecithin.

Examples of compounds containing carboxyl groups and hydroxyl groups include 2,2-dimethylolpropionic acid, tartaric acid, carboxyl group containing adipate based polyol (i.e., the reaction products of ethylene glycol, adipic acid, and 2,2-dimethylolpropionic acid; the reaction products of 1,4-butylene glycol, adipic acid, and 2,2-dimethylolpropionic acid; and the reaction products of 1,4-cyclohexanedimethanol, adipic acid, and 2,2-dimethylolpropionic acid; and carboxyl group containing isophthalate base polyols (i.e., the reaction products of 1,4-butylene glycol, isophthalic acid, and dimethylolpropionic acid).

Examples of the compounds containing sulfonate groups and hydroxyl groups include N,N-bis(2-hydroxyethyl)-2-aminoethanesulfonic acid, sulfone group containing adipate base polyol i.e., the reaction products of 1,4-butylene glycol, adipic acid, and N,N-bis(2-hydroxyethyl)-2-aminoethanesulfonic acid; and the reaction products of 1,4-cyclohexanedimethanol, adipic acid, and N,N-bis(hydroxyethyl)-2-aminoethanesulfonic acid].

Examples of compounds containing phosphate groups and hydroxyl groups include the reaction products of 2,3-dihydroxypropylphenylphosphate, 2,3-epoxypropanol, and phosphoric acid; the reaction products of 2,3-epoxypropanol and phenylphosphonic acid; and the reaction products of 2,3-epoxypropanol and monophosphoric acid ester.

According to the present invention, polyurethane compositions have very good properties such as hydrolytic stability, tensile strength, and pigment dispersion when neutralized with piperidine derivatives or piperazinone derivatives, as compared to urethane compositions containing acidic hydrophilic groups which are neutralized with alkaline metal hydroxides or alkyl amines.

Generally, any piperidine derivative can be utilized which is known to the art as well as to the literature and specific examples include 2,2,6,6-tetramethyl piperidine derivates [i.e., 4-acetoxy-2,2,6,6-tetramethylpiperidine, 4-stearoyloxy-2,2,6,6-tetramethyl piperidine, 4-benzoyloxy-2,2,6,6-tetramethyl piperidine, 4-acryloyl-2,2,6,6-tetramethyl piperidine,4-(phenylcarbamoyloxy)-2,2,6,6-tetramethyl piperidine, 4-phenoxy-2,2,6,6-tetramethyl piperidine, 4-benzyloxy-2,2,6,6-tetramethyl piperidine, 4-cyclohexyloxy-2,2,6,6-tetramethyl piperidine, 4-methoxy-2,2,6,6-tetramethyl piperidine, 4-(p-chlorobenzoyloxy)-2,2,6,6-tetramethyl piperidine, bis(2,2,6,6-tetramethyl-4-piperidyl) oxalate, bis(2,2,6,6-tetramethyl-4-piperidyl) sebacate [i.e., Sanol LS-770: Sankyo Kabushiki Kaisha, trade name], bis(2,2,6,6-tetramethyl-4-piperidyl) adipate, bis(2,2,6,6-tetramethyl-4-piperidyl) malonate, bis(2,2,6,6-tetramethyl-4-piperidyl) terephthalate, bis(2,2,6,6-tetramethyl-4-piperidyl) hexamethylene-1,6-dicarbamate, 1,2-bis(2,2,6,6-tetramethyl-4-piperidyloxy)-ethane, α,α-bis(2,2,6,6-tetramethyl-4-piperidyloxy)-p-xylene, tris(2,2,6,6-tetramethyl-4-piperidyl) benzene-1,3,5-tricarboxylate, tetra(2,2,6,6-tetramethyl-4-piperidyl) butane-1,2,3,4-tetracarboxylate, poly[{6-(1,1,3,3-tetramethylbutyl) imino-1,3,5-triazine-2,4-diyl} {(2,2,6,6-tetramethyl-4-piperidyl) imino} hexamethylene {(2,2,6,6-tetramethyl-4-piperidyl imino)}] etc.; and the 6,6-pentamethylpiperidine derivatives such as bis(1,2,2,6,6-pentamethyl-4-piperidyl) sebacate, 2-(3,5-t-butyl-4-hydroxybenzyl)-2-n-butyl malonate bis(1,2,2,6,6-pentamethyl-4-piperidyl) [i.e., Tinuvin 144: Ciba-Geigy, trade name], N,N-bis-(3-aminopropyl) ethylenediamine, 4-[1,2,2,6,6,-pentamethyl-4-piperidyl) amino)]-6-chloro-1,3,5-triazine mixture. These piperidine derivatives are commercial products or compounds found in the literature (Kokai Sho59-30850).

Another neutralizing agent which has been found to yield good properties to the polyurethane compositions are piperazinone derivatives which are known to the art and to the literature with specific examples including $N^1$-propyl-3,3,5,5-tetramethyl-2-piperazinone, $N^1$-isopropyl-3,3,5,5-tetramethyl-2-piperazinone, $N^1$-dodecyl-3,3,5,5-tetramethyl-2-piperazinone, $N^1$-t-octyl-3,3,5,5-tetramethyl-2-piperazinone, 1,2-ethane-bis-($N^1$-t-3,3,5,5-tetramethyl-2-piperazinone), (i.e., Goodrite ®-3034: BFGoodrich Co.; trade name), $N^4$-t-octyl-3,3,6,6-tetramethyl-2-piperazinone, $N^1$-phenyl-3,3,5,5-tetramethyl-2-piperazinone, $N^1$-t-butyl-3,3-dimethyl 5,5-pentamethylene-2-piperazinone, 2,4,6-tris{cyclohexyl[2-(3,3,5,5-tetramethyl-2-oxo-1-piperazinyl) ethyl] amino}-1,3,5-triazine, etc. The piperazinone derivatives include commercial products and compounds found in the literature (e.g. Kokai Sho 54-56987).

The piperidine derivatives and the piperazinone derivatives of the present invention used as neutralizing agents yield TPU's having improved property retention properties such as rupture strength and better hydrolysis resistance as measured by weight average molecular weight retention, as set forth in Table I. Retention of rupture strength after standing for one week at 50° C. and 96 percent relative humidity, as compared to initial rupture strength, is generally at least 70 percent, desirably at least 80 percent, more desirably at least 85 percent, and preferably at least 90. Another measure of effectiveness of the neutralization agents of the present invention is the retention of the weight average molecular weight after standing for one week at 50° C. and at 96 percent relative humidity versus the initial molecular weight of the polyurethane. The retention weight of the molecular weight according to the present invention is generally at least 85 percent, desirably at least 90 percent, more desirably at least 95 percent, and preferably at least 100 percent. The actual amount of neutralizing agent utilized will, of course, vary depending upon the amount of the hydrophilic acid compound contained either in the composition or within the urethane polymer, as well as upon the specific urethane polymer, the specific neutralizing agent, the amount of property retention desired, and the like.

Various conventional catalysts can be utilized in the polymerization of the polyurethane to the present invention such as various alkyl tin catalysts with the alkyl group having from about 4 to about 20 carbon atoms. Specific examples of reaction catalysts include tin oxylate, dibutyltin, tetramethylbutyltin, trioctylamine, etc.

An acidic hydrophilic group containing polyurethane is neutralized with a neutralizing agent (i.e., piperidine derivatives or piperazinone derivatives), and the method is given below.

[1] An acidic hydrophilic group containing polyurethane was dissolved and then a neutralizing agent in an amount equivalent to the acid-value equivalent of the polyurethane was added and the mixture and stirred for 5-60 minutes at 10°-230° C. The solvents which can be utilized are not limited except to compounds in which the polyurethane can dissolve therein and generally include the various alkanes and aromatic compounds, as well as combinations thereof, generally having a total of from about 5 to about 20 carbon atoms as well as various ketones having a total of from about 3 to about 12 carbon atoms with examples of specific solvents including tetrahydrofuran, methyl ethyl ketone, cyclohexanone, methyl isobutyl ketone, ethyl acetate, toluene, xylene, etc.; or

[2] An acidic hydrophilic group containing polyurethane was dissolved with heating, and then a neutralizing agent was added, and stirred. The heating was achieved by the use of a heated extruder.

The preparation of the various polyurethanes in accordance with conventional procedures and methods and since as noted above, generally any type of polyurethane can be utilized, the various amounts of specific components thereof, the various reactant ratios, processing temperatures, catalysts in the amount thereof, polymerizing equipment such as the various types of extruders, and the like, are all generally conventional, and well as known to the art and to the literature.

A mixture of polyurethane and acidic hydrophilic group containing compound was neutralized by the method given below.

EXAMPLES

Examples and comparisons are given below. This invention is not limited to these examples.

EXAMPLE 1

A mixture containing 490 g of methyl ethyl ketone (MEK hereafter), 137.1 g of poly-1,4-butylene adipate [number average molecular weight (Mn hereafter) 1000], and 3.5 g of dimethylpropionic acid were stirred while heating at 75° C. Subsequently, 53.8 g of a mixture consisting of 80 percent 2,4-tolylenediisocyanate and 20 percent 2,6-tolylenediisocyanate (TDI hereafter) was added dropwise to the above over a 30-minute period. Additionally, 0.2 g of tin oxtylate was added and, after two hours, 15.5 g of neopentyl glycol (NPG hereafter) were added. The reaction was carried out after the addition of the TDI mixture for ten hours at 75° C. while stirring the mixture. After the reaction, the polyurethane solution was cooled to room temperature.

The resulting polyurethane solution was characterized by gel permeation chromatography (GPC hereafter) (molecular weight correction: polystyrene standard molecule weight), and the weight average molecular weight (Mw hereafter) of the polyurethane and the acid value were 65,300 and 6.9, respectively.

Subsequently, the carboxylic group in the polyurethane solution was neutralized with 6.3 g of Sanol LS-770.

A sample film was prepared and tested by the following manner, (1) Preparation of hydrolysis resistant film and its testing:

The neutralized polyurethane solution was cast with a doctor blade onto a release-type paper to give a 50 μm dried thickness; the film was dried for two hours at 60° C. and then for eight hours at 100° C. to obtain a sample film having a thickness of approximately 50 μm. The testing was carried out with a swelling testing apparatus CT-3 (Suga Instrument Co.), and the results are shown in Table I.

(2) Preparation of film for rupture strength testing and its testing:

The film was prepared according to the procedure given in (1) and the sample size was 1 cm×5 cm.

The testing was carried out by using an Autograph AG1000G type (Shimazu Seisakusho), and the results are given in Table I.

EXAMPLE 2

A mixture consisting of 323.2 g of adipic acid, 205.3 g of 1,4-butylene glycol, 47.2 g of N,N-bis(2-hydroxyethyl)-2-aminoethanesulfonic acid, 37.4 g of GR-3034, 50 g of xylene, and 0.05 g of dibutyltin was heated to 160° C. while stirring. The mixture was heated to 200° C. over a five hour period while removing the water formed. The acid value of the reaction mixture was measured and the reaction was terminated at the acid value of 25.0. The reaction products were transferred into a rotary evaporator and the pressure was gradually lowered to 5 mm Hg at 60° C. to remove the low boiling components (xylene and others). The Mn of the resulting polyol was 993.

58.3 g of the obtained polyol, 124.8 g of poly 1,4-butylene glycol adipate (Mn 1002), and 23.3 g of NPG were added to a 500-mL metal container, and the contents were heated to 120° C. In another 500-mL metal container 99.3 g of diphenylmethanediisocyanate (MDI hereafter) were added and heated to 120° C. MDI was then added to the container containing the polyol and other components, and the contents were stirred for three minutes. The reaction products were transferred into a bath and cured for 10 hours at 60° C.

The polyurethane product had an Mw of 73,400. The polyurethane was pulverized and 40 g of the powdered material were dissolved in 160 g of tetrahydrofuran (THF hereafter) to obtain a polyurethane solution.

A sample film was prepared according to Example 1 and hydrolysis resistance test and a rupture strength test were carried out. The results are shown in Table I.

EXAMPLE 3

A mixture consisting of 158.6 g of THF and 158.6 g of phenylsulfonic acid was heated to 50° C. while stirring. To the heated mixture, a solution consisting of 81.4 g of 2,3-epoxypropanol and 81.4 g of THF was added dropwise to the above solution over a two hour span, then the mixture was allowed to react at 50° C. for one hour. THF in the reaction solution was removed by distillation under low pressure and a viscous reaction product was obtained.

3.8 g of the reaction products, 195.8 g of Placcel 210 (Mw 1000), and 12.8 g of 1,4-butylene glycol were charged into a 500-mL metal container, and the contents were heated to 120° C. In another 500-mL metal container, 87.8 g of MDI was heated to 120° C. The MDI was then added to the container containing polyol and the other components and stirred for three minutes. The reaction mixture was transferred to a bath and heated for 15 hours at 60° C. The resulting polyurethane was characterized by GPC and the Mw and acid value were 81,600 and 2.8, respectively. 40 g of polyurethane were dissolved in 160 g of THF and then the resulting polyurethane solution was neutralized with 0.52 g of LS-770. The neutralized solution was used to prepare a film according to Example 1, and then a hydrolysis resistance test and a rupture strength test were carried out and tabulated in Table I.

EXAMPLE 4

A mixture consisting of 240.6 g of 1,4-butylene adipate (Mn 1000), 5.8 g of 1,4-butylene glycol, and 6.7 g of NPG was heated to 100° C. In another 500-mL metal container 82.8 g of MDI were heated at 100° C. The heated MDI was added to the container containing the polyol and the other components, then the mixture was stirred for three minutes. The reaction mixture was transferred to a bath and heated for 15 hours at 60° C. to prepare polyurethane. The polyurethane was characterized by GPC, and the Mw was 112,000. 40 g of pulverized polyurethane were dissolved in 160 g of MEK. To this solution, 1.27 g of palmitic acid were added and then neutralized with 1.26 g of Sanol LS-770. By using this neutralized solution, a sample film was prepared according to Example 1 and a hydrolysis resistance test and a rupture test were carried out. The results are shown in Table I.

EXAMPLE 5

40 g of polyurethane powder obtained from Example 4 were dissolved in 160 g of MEK to prepare a polyurethane solution. To this solution 0.96 g of Gafac RE 410 were added and then the solution was neutralized with 0.95 g of Tinuvin 144. This neutralized solution was used for preparing a sample film according to Example 1 and the hydrolysis resistance and rupture strength tests were carried out. The results are shown in Table I.

COMPARISON 1

The polyurethane solution, without neutralization, obtained from Example 1 was used to prepare a sample film according to the method of Example 1 and then the hydrolysis resistance and rupture strength tests were carried out. The results are shown in Table I.

COMPARISON 2

An alkaline solution was prepared by mixing 30.0 g of water and 5.3 g of sodium hydroxide. To the alkaline solution, 47.2 g of N,N-bis(2-hydroxyethyl)-2-aminoethanesulfonic acid were added slowly to obtain a sodium salt. To this, 323.2 g of adipic acid, 205.3 g of 1,4-butylene glycol, 50 g of xylene, and 0.05 g of dibutyltin were added and the mixture was heated to 160° C. Aceotropic water and water were removed, and a polyol of Mn 996 was obtained according to the procedure of Example 1.

The obtained 53.6 g of polyol, 124.8 g of poly-1,4-butylene adipate (Mn 1002), and 23.3 g of NPG were added to a 500-mL metal container, and the contents were heated to 120° C. In another 500-mL metal container, 199.3 g of MDI were added and heated to 120° C. This MDI was added to the container containing polyol and the other components and was stirred for three minutes. The mixture was then cured for 10 hours at 60° C. The polyurethane obtained had an Mw of 74,600. The polyurethane was pulverized and 40 g of the powdered polyurethane were dissolved in 160 g of THF to prepare a polyurethane solution.

A sample film was prepared according to Example 1 and the hydrolysis resistance and rupture strength tests were carried out. The results are shown in Table I.

COMPARISON 3

40 g of the polyurethane powder obtained from Example 3 were dissolved in 160 g of THF and neutralized with 0.37 g of n-tributylamine and stirred thoroughly.

A test film was prepared according to Example 1 and the hydrolysis resistance and rupture strength tests were carried out. The results are shown in Table I.

COMPARISON 4

40 g of the polyurethane powder obtained from Example 4 were dissolved in 160 g of MEK and then 1.27 of palmitic acid were added and the mixture was stirred thoroughly. A test film was prepared according to Example 1 and the hydrolysis resistance and rupture strength tests were carried out. The results are shown in Table I.

COMPARISON 5

A 40 g of the polyurethane powder obtained from Example 4 was dissolved in 160 g of MEK and then 0.96 g of Gafac RE 410 were added and the mixture was stirred thoroughly. A test film was prepared according to Example 1 and hydrolysis resistance test and rupture strength test were carried out. The results are shown in Table I.

TABLE I

| Exs. & Comparisons | | Groups Contained | Acid Neutralizing Agent | Hydrolysis Resistance Test | | | Rupture Strength Test | | |
|---|---|---|---|---|---|---|---|---|---|
| | | | | Mw of initial polyurethane | Mw of polyurethane after standing Mw *1 | Retention rate of Mw (%) *2 | Initial strength (kg/cm²) | Strength after standing (kg/cm²) *1 | Retention rate (%) *3 |
| Comparisons | 1 | Carboxyl | Sanol LS-770 | 65,300 | 66,000 | 101 | 352 | 298 | 85 |
| | 2 | Sulfonic acid | GR-3034 | 73,400 | 73,200 | 100 | 461 | 434 | 94 |
| | 3 | Phosphoric acid | Sanol LS-770 | 81,600 | 81,500 | 100 | 430 | 365 | 85 |
| | 4 | Carboxyl | Sanol LS-770 | 112,000 | 111,800 | 100 | 395 | 351 | 89 |
| | 5 | Phosphoric acid | Tinuvin 144 | 112,000 | 113,800 | 101 | 387 | 309 | 80 |
| Examples | 1 | Carboxyl | None | 65,300 | 36,000 | 55 | 352 | 105 | 30 |
| | 2 | Sulfonic acid | Sodium | 74,600 | 50,700 | 68 | 461 | 193 | 40 |
| | 3 | Phosphoric acid | n-Butylamine | 81,600 | 65,200 | 80 | 430 | 281 | 65 |
| | 4 | Carboxyl | None | 112,000 | 48,100 | 43 | 395 | 137 | 35 |
| | 5 | Phosphoric | None | 112,000 | 39,200 | 35 | 387 | 78 | 20 |

TABLE I-continued

| | | | Hydrolysis Resistance Test | | | Rupture Strength Test | | |
|---|---|---|---|---|---|---|---|---|
| Exs. & Comparisons | Groups Contained | Acid Neutralizing Agent | Mw of initial poly- urethane | Mw of polyurethane after stand- ing Mw *1 | Retention rate of Mw (%) *2 | Initial strength (kg/cm²) | Strength after standing (kg/cm²) *1 | Retention rate (%) *3 |
| | acid | | | | | | | |

Note
*1 - Allowed to stand for one week at 50° C. and 96 percent relative humidity

*2 - $\dfrac{\text{Mw of polyurethane after standing}}{\text{Initial Mw of polyurethane}} \times 100$

*3 - $\dfrac{\text{Strength after standing}}{\text{Initial strength}} \times 100$ The polyurethane composition of the invention has excellent hydrolysis resistance and rupture strength, and can be used for adhesives, paints, and as a bonding agent for magnetic recording media. When utilized in magnetic recording mediums, any general type of magnetic particles can be utilized such as various ferrite particles well known to the art and to the literature.

While in accordance with the Patent Statutes, the best mode and preferred embodiment has been set forth, the scope of the invention is not limited thereto, but rather by the scope of the attached claims.

What is claimed is:

1. A polymeric composition having hydrolytic resistance, comprising:
    a polyurethane composition comprising, a polyurethane molecule containing at least one acidic hydrophilic group, or a mixture of a polyurethane and at least one compound having at least one acidic hydrophilic group, or combinations thereof, said polyurethane composition neutralized with at least one piperidine derivative, or at least one piperazinone derivative, or combinations thereof.

2. A polymeric composition according to claim 1, wherein said at least one acidic hydrophilic group is derived from, and wherein said at least one acidic hydrophilic group containing compound is, a compound containing a carboxyl group, a compound containing a sulfonate group, a compound containing a phosphate group, a compound containing a carboxyl group and a hydroxyl group, a compound containing a sulfonate group and a hydroxyl group, or a compound containing a phosphate group and a hydroxyl group.

3. A polymeric composition according to claim 2, wherein said piperidine derivates is 4-acetoxy-2,2,6,6-tetramethylpiperidine, 4-stearoyloxy-2,2,6,6-tetramethyl piperidine, 4-benzoyloxy-2,2,6,6-tetramethyl piperidine, 4-acryloyl-2,2,6,6-tetramethyl piperidine, 4-(phenylcarbamoyloxy)-2,2,6,6-tetramethyl piperidine, 4-phenoxy-2,2,6,6-tetramethyl piperidine, 4-benzyloxy-2,2,6,6-tetramethyl piperidine, 4-cyclohexyloxy-2,2,6,6-tetramethyl piperidine, 4-methoxy-2,2,6,6-tetramethyl piperidine, 4-(p-chlorobenzoyloxy)-2,2,6,6-tetramethyl piperidine, bis(2,2,6,6-tetramethyl-4-piperidyl) oxalate, bis(2,2,6,6-tetramethyl-4-piperidyl) sebacate, bis(2,2,6,6-tetramethyl-4-piperidyl) adipate, bis(2,2,6,6-tetramethyl-4-piperidyl) malonate, bis(2,2,6,6-tetramethyl-4-piperidyl) terephthalate, bis(2,2,6,6-tetramethyl-4-piperidyl) hexamethylene-1,6-dicarbamate, 1,2-bis(2,2,6,6-tetramethyl-4-piperidyloxy)-ethane, α,α-bis(2,2,6,6-tetramethyl-4-piperidyloxy)-p-xylene, tris(2,2,6,6-tetramethyl-4-piperidyl) benzene-1,3,5-tricarboxylate, tetra(2,2,6,6-tetramethyl-4-piperidyl) butane-1,2,3,4-tetracarboxylate, poly[{6-(1,1,3,3-tetramethylbutyl) imino-1,3,5-triazine-2,4-diyl} {(2,2,6,6-tetramethyl-4-piperidyl) imino} hexamethylene {(2,2,6,6-tetramethyl-4-piperidyl imino} bis(1,2,2,6,6-pentamethyl-4-piperidyl) sebacate, 2-(3,5-t-butyl-4-hydroxybenzyl)-2-n-butyl malonate bis(1,2,2,6,6-pentamethyl-4-piperidyl) or N,N-bis-(3-aminopropyl) ethylenediamine-2, or 4-[1,2,2,6,6,-pentamethyl-4-piperidyl) amino)]-6-chloro-1,3,5-triazine mixture, and wherein said piperidine derivative is $N^1$-propyl-3,3,5,5-tetramethyl-2-piperazinone, $N^1$-isopropyl-3,3,5,5-tetramethyl-2-piperazinone, $N^1$-dodecyl-3,3,5,5-tetramethyl-2-piperazinone, $N^1$-t-octyl-3,3,5,5-tetramethyl-2-piperazinone, 1,2-ethane-bis-($N^1$-t-3,3,5,5-tetramethyl-2-piperazinone), $N^4$-t-octyl-3,3,6,6-tetramethyl-2-piperazinone, $N^1$-phenyl-3,3,5,5-tetramethyl-2-piperazinone, $N^1$-t-butyl-3,3-dimethyl 5,5-pentamethylene-2-piperazinone, or 2,4,6-tris{cyclohexyl[2-(3,3,5,5-tetramethyl-2-oxo-1-piperazinyl) ethyl] amino}-1,3,5-triazine.

4. A polymeric composition according to claim 3, wherein said carboxyl group containing compound is acetic acid, propionic acid, butyric acid, palmitic acid, stearic acid, myristic acid, oleic acid, caprylic acid, lauric acid, coconut acid, caproic acid, linoleic acid, beef tallow acid, adipic acid, maleic acid, benzoic acid, phthalic acid, terephthalic acid, or isophthalic acid;
    wherein said sulfonate group containing compound is sulfuric acid, paratoluenesulfonic acid, naphthalenesulfonic acid, benzenesulfonic acid, 5-sulfoisophthalic acid, 2-sulfophthalic acid, 5-sulfobenzoic acid, N,N-bis(2-hydroxyethyl)-2-aminoethanesulfonic acid, sulfophthalic acid, dodecylbenzenesulfonic acid, oleyl methyl tauric acid, lauryl methyl tauric acid, or sulfosuccinate;
    wherein said phosphate group containing compound is phosphoric acid, phosphorous acid, butyl acid phosphate, butoxyethyl acid phosphate, 2-ethylhexyl acid phosphate, di(2-ethylhexyl) phosphate, isodecyl acid phosphate, monoisodecyl phosphate, or lecithin;
    wherein said compound containing a carboxyl group and a hydroxyl group is 2,2-dimethylolpropionic acid, tartaric acid, the reaction products of ethylene glycol, adipic acid, and 2,2-dimethylolpropionic acid, the reaction products of 1,4-butylene glycol, adipic acid, and 2,2-dimethylolpropionic acid; the reaction products of 1,4-cyclohexanedimethanol, adipic acid, and 2,2-dimethylolpropionic acid); or the reaction products of 1,4-butylene glycol, isophthalic acid, and dimethylolpropionic acid;
    wherein said compound containing a sulfonate group and a hydroxyl group is N,N-bis(2-hydroxyethyl)-2-aminoethanesulfonic acid, the reaction products of 1,4-butylene glycol, adipic acid, and N,N-bis(2-hydroxyethyl)-2-aminoethanesulfonic acid; or the reaction products of 1,4-cyclohexanedimethanol, adipic acid, and N,N-bis(hydroxyethyl)-2-aminoethanesulfonic acid]; and wherein said compound containing a phosphate group and a hydroxyl group is the reaction products of 2,3-dihydroxypropylphenylphosphate, 2,3-epoxypropanol, and phosphoric acid; the reaction products of 2,3-epoxypropanol and phenylphosphonic acid; or the reaction products of 2,3-epoxypropanol and monophosphoric acid ester.

5. A polymeric composition according to claim 4, wherein said neutralizing compound is bis(2,2,6,6-tetramethyl-4-piperidyl) sebacate, 2-(3,5-t-butyl-4-hydroxybenzyl)-2-n-butyl malonate bis(1,2,2,6,6-pentamethyl-4-piperidyl), or 1,2-ethane-bis-($N^1$-t-3,3,5,5-tetramethyl-2-piperazinone), and wherein said acidic group containing compound is dimethylpropionic acid, bis(2-hydroxyethyl)-2-aminoethanesulfonic acid, phenylsulfonic acid, palmitic acid, or monoisodecyl phosphate.

6. A polymeric composition according to claim 1, wherein the rupture strength retention of said composition after standing for one week at 50° C. and 96 relative humidity is at least 70 percent.

7. A polymeric composition according to claim 5, wherein the rupture strength retention of said composition after standing for one week at 50° C. and 96 relative humidity is at least 90 percent.

8. A polymeric composition according to claim 1, wherein the molecular weight retention of said polyurethane after standing for one week at 50° C. and 96 percent relative humidity is at least 85 percent.

9. A polymeric composition according to claim 3, wherein the molecular weight retention of said polyurethane after standing for one week at 50° C. and 96 percent relative humidity is at least 90 percent.

10. A polymeric composition according to claim 5, wherein the molecular weight retention of said polyurethane after standing for one week at 50° C. and 96 percent relative humidity is at least 95 percent.

11. A magnetic coating formulation; comprising:
magnetic particles and a binder, at least a portion of said binder being a neutralized polyurethane composition comprising, a polyurethane molecule containing at least one acidic hydrophilic group, or a mixture of a polyurethane and at least one compound having at least one acidic hydrophilic group, or combinations thereof, said polyurethane composition neutralized with at least one piperidine derivative, or at least one piperazinone derivative, or combinations thereof.

12. A magnetic coating formulation according to claim 11, wherein said at least one acidic hydrophilic group is derived from, and wherein said at least one acidic hydrophilic group containing compound, is a compound containing a carboxyl group, a compound containing a sulfonate group, a compound containing a phosphate group, a compound containing a carboxyl group and a hydroxyl group, a compound containing a sulfonate group and a hydroxyl group, or a compound containing a phosphate group and a hydroxyl group.

13. A magnetic coating formulation according to claim 12, wherein said piperidine derivative is 4-acetoxy-2,2,6,6-tetramethylpiperidine, 4-stearoyloxy-2,2,6,6-tetramethyl piperidine, 4-benzoyloxy-2,2,6,6-tetramethyl piperidine, 4-acryloyl-2,2,6,6-tetramethyl piperidine, 4-(phenylcarbamoyloxy)-2,2,6,6-tetramethyl piperidine, 4-phenoxy-2,2,6,6-tetramethyl piperidine, 4-benzyloxy-2,2,6,6-tetramethyl piperidine, 4-cyclohexyloxy-2,2,6,6-tetramethyl piperidine, 4-methoxy-2,2,6,6-tetramethyl piperidine, 4-(p-chlorobenzoyloxy)-2,2,6,6-tetramethyl piperidine, bis(2,2,6,6-tetramethyl-4-piperidyl) oxalate, bis(2,2,6,6-tetramethyl-4-piperidyl) sebacate, bis(2,2,6,6-tetramethyl-4-piperidyl) adipate, bis(2,2,6,6-tetramethyl-4-piperidyl) malonate, bis(2,2,6,6-tetramethyl-4-piperidyl) terephthalate, bis(2,2,6,6-tetramethyl-4-piperidyl) hexamethylene-1,6-dicarbamate, 1,2-bis(2,2,6,6-tetramethyl-4-piperidyloxy)-ethane, α,α-bis(2,2,6,6-tetramethyl-4-piperidyloxy)-p-xylene, tris(2,2,6,6-tetramethyl-4-piperidyl) benzene-1,3,5-tricarboxylate, tetra(2,2,6,6-tetramethyl-4-piperidyl) butane-1,2,3,4-tetracarboxylate, poly[{6-(1,1,3,3-tetramethylbutyl) imino-1,3,5-triazine-2,4-diyl} {(2,2,6,6-tetramethyl-4-piperidyl) imino} hexamethylene {(2,2,6,6-tetramethyl-4-piperidyl imino}, bis(1,2,2,6,6-pentamethyl-4-piperidyl) sebacate, 2-(3,5-t-butyl-4-hydroxybenzyl)-2-n-butyl malonate bis(1,2,2,6,6-pentamethyl-4-piperidyl) or N,N-bis-(3-aminopropyl) ethylenediamine-2, or 4-[1,2,2,6,6,-pentamethyl-4-piperidyl) amino)]-6-chloro-1,3,5-triazine mixture, and wherein said piperidine derivative is $N^1$-propyl-3,3,5,5-tetramethyl-2-piperazinone, $N^1$-isopropyl-3,3,5,5-tetramethyl-2-piperazinone, $N^1$-dodecyl-3,3,5,5-tetramethyl-2-piperazinone, $N^1$-t-octyl-3,3,5,5-tetramethyl-2-piperazinone, 1,2-ethane-bis-($N^1$-t-3,3,5,5-tetramethyl-2-piperazinone), $N^4$-t-octyl-3,3,6,6-tetramethyl-2-piperazinone, $N^1$-phenyl-3,3,5,5-tetramethyl-2-piperazinone, $N^1$-t-butyl-3,3-dimethyl 5,5-pentamethylene-2-piperazinone, or 2,4,6-tris{cyclohexyl[2-(3,3,5,5-tetramethyl-2-oxo-1-piperazinyl) ethyl] amino}-1,3,5-triazine.

14. A magnetic coating composition according to claim 13, wherein said carboxyl group containing compound is acetic acid, propionic acid, butyric acid, palmitic acid, stearic acid, myristic acid, oleic acid, caprylic acid, lauric acid, coconut acid, caproic acid, linoleic acid, beef tallow acid, adipic acid, maleic acid, benzoic acid, phthalic acid, terephthalic acid, or isophthalic acid;

wherein said sulfonate group containing compound is sulfuric acid, paratoluenesulfonic acid, naphthalenesulfonic acid, benzenesulfonic acid, 5-sulfoisophthalic acid, 2-sulfophthalic acid, 5-sulfobenzoic acid, N,N-bis(2-hydroxyethyl)-2-aminoethanesulfonic acid, sulfophthalic acid, dodecylbenzenesulfonic acid, oleyl methyl tauric acid, lauryl methyl tauric acid, or sulfosuccinate;

wherein said phosphate group containing compound is phosphoric acid, phosphorous acid, butyl acid phosphate, butoxyethyl acid phosphate, 2-ethylhexyl acid phosphate, di(2-ethylhexyl) phosphate, isodecyl acid phosphate, monoisodecyl phosphate, or lecithin;

wherein said compound containing a carboxyl group and a hydroxyl group is 2,2-dimethylolpropionic acid, tartaric acid, the reaction products of ethylene glycol, adipic acid, and 2,2-dimethylolpropionic acid; the reaction products of 1,4-butylene glycol, adipic acid, and 2,2-dimethylolpropionic acid; the reaction products of 1,4-cyclohexanedimethanol, adipic acid, and 2,2-dimethylolpropionic acid); or the reaction products of 1,4-butylene glycol, isophthalic acid, and dimethylolpropionic acid;

wherein said compound containing a sulfonate group and a hydroxyl group is N,N-bis(2-hydroxyethyl)-2-aminoethanesulfonic acid, the reaction products of 1,4-butylene glycol, adipic acid, and N,N-bis(2- hydroxyethyl)-2-aminoethanesulfonic acid; or the reaction products of 1,4-cyclohexanedimethanol, adipic acid, and N,N-bis(hydroxyethyl)-2-aminoethanesulfonic acid]; and wherein said compound containing a phosphate group and a hydroxy group is the reaction products of 2,3-dihydroxypropylphenylphosphate, 2,3-epoxypropanol, and phosphoric acid; the reaction products of 2,3-epoxypropanol and phenylphosphonic acid; or the reaction products of 2,3-epoxypropanol and monophosphoric acid ester.

15. A magnetic coating composition according to claim 14, wherein said neutralizing compound is bis(2,2,6,6-tetramethyl-4-piperidyl) sebacate,2-(3,5-t-butyl-4-hydroxybenzyl)-2-n-butylmalonate bis(1,2,2,6,6-pentamethyl-4-piperidyl), or 1,2-ethane-bis-($N^1$-t-3,3,5,5-tetramethyl-2-piperazinone), and wherein said acidic group containing compound is dimethylpropionic acid, bis(2-hydroxyethyl)2-aminoethanesulfonic acid, phenylsulfonic acid, palmitic acid, or monoisodecyl phosphate.

16. A magnetic coating composition according to claim 11, wherein the rupture strength retention of said neutralized urethane in said composition is at least 70 percent after standing for one week at 50° C. and 96 relative humidity.

17. A magnetic coating composition according to claim 15, wherein the rupture strength retention of said neutralized urethane in said composition is at least 90 percent after standing for one week at 50° C. and 96 relative humidity.

18. A magnetic coating composition according to claim 1, wherein the molecular weight retention of said neutralized urethane in said composition is at least 85 percent after standing for one week at 50° C. and 96 percent relative humidity.

19. A magnetic coating composition according to claim 13, wherein the molecular weight retention of said neutralized urethane in said composition is at least 90 percent after standing for one week at 50° C. and 96 percent relative humidity.

20. A magnetic coating composition according to claim 15, wherein the molecular weight retention of said neutralized urethane in said composition is at least 95 percent after standing for one week at 50° C. and 96 percent relative humidity.

* * * * *